(12) United States Patent
Chiba et al.

(10) Patent No.: US 7,742,081 B2
(45) Date of Patent: Jun. 22, 2010

(54) IMAGING APPARATUS FOR IMAGING AN IMAGE AND IMAGE PROCESSOR AND METHOD FOR PERFORMING COLOR CORRECTION UTILIZING A NUMBER OF LINEAR MATRIX OPERATIONS

(75) Inventors: Takuya Chiba, Tokyo (JP); Yutaka Yoneda, Kanagawa (JP); Akira Matsui, Kanagawa (JP); Masaya Kinoshita, Kanagawa (JP)

(73) Assignee: Sony Corporation (JP)

( * ) Notice: Subject to any disclaimer, the term of this patent is extended or adjusted under 35 U.S.C. 154(b) by 709 days.

(21) Appl. No.: 11/526,994

(22) Filed: Sep. 26, 2006

(65) Prior Publication Data

US 2007/0132858 A1    Jun. 14, 2007

(30) Foreign Application Priority Data

Sep. 28, 2005   (JP) ............................ P2005-281380

(51) Int. Cl.
*H04N 9/73* (2006.01)
*H04N 3/14* (2006.01)

(52) U.S. Cl. .................... 348/223.1; 348/273; 348/280; 348/296; 358/516

(58) Field of Classification Search ....................... None
See application file for complete search history.

(56) References Cited

U.S. PATENT DOCUMENTS

| | | | | |
|---|---|---|---|---|
| 6,100,928 A | * | 8/2000 | Hata | ........................ 348/229.1 |
| 6,753,908 B1 | * | 6/2004 | Nakamura et al. | ........ 348/223.1 |
| 7,468,746 B2 | * | 12/2008 | Sugimoto | ................ 348/229.1 |
| 7,489,346 B2 | * | 2/2009 | Mizukura et al. | ......... 348/223.1 |
| 2004/0135899 A1 | * | 7/2004 | Suemoto | ................... 348/223.1 |
| 2004/0206826 A1 | * | 10/2004 | Kubota | ........................ 235/469 |
| 2007/0070216 A1 | * | 3/2007 | Yabe | ....................... 348/229.1 |

FOREIGN PATENT DOCUMENTS

JP        2000-050299         2/2000

* cited by examiner

*Primary Examiner*—Ngoc-Yen T Vu
(74) *Attorney, Agent, or Firm*—Lerner, David, Littenberg, Krumholz & Mentlik, LLP

(57) ABSTRACT

An imaging apparatus for imaging an image using a solid-state image pickup device includes a first linear matrix operation unit configured to perform matrix conversion upon a color component of an image signal obtained by imaging using coefficients capable of improving color reproducibility; a second linear matrix operation unit configured to perform matrix conversion upon the color component using coefficients capable of achieving noise component reduction; a signal combining unit configured to combine image signals output from a plurality of signal processing systems each of which includes one of the first or second linear matrix operation units; and a combination ratio setting unit configured to set a combination ratio so that, when a subject is bright, an image signal output from the signal processing system that includes the first linear matrix operation unit can be combined in an amount larger than the image signals output from the other signal processing systems.

16 Claims, 11 Drawing Sheets

IMAGING APPARATUS FOR IMAGING AN IMAGE AND IMAGE PROCESSOR AND METHOD FOR PERFORMING COLOR CORRECTION UTILIZING A NUMBER OF LINEAR MATRIX OPERATIONS

CROSS-REFERENCE TO RELATED APPLICATIONS

The present application claims priority from Japanese Patent Application No. JP 2005-281380 filed on Sep. 28, 2005, the disclosure of which is hereby incorporated by reference herein.

BACKGROUND OF THE INVENTION

1. Field of the Invention

The present invention relates to imaging apparatuses for picking up images using solid-state image pickup devices and image processors for performing color correction processing upon input image signals, and, more particularly, to an imaging apparatus having a linear matrix operation function and an image processor.

2. Description of the Related Art

A linear matrix operation technique is attracting attention as a technique for correctly reproducing colors in imaging apparatuses that use solid-state image pickup devices, such as a digital still camera and a digital video camera. The linear matrix operation technique improves color reproducibility by performing a linear matrix operation corresponding to the following equation 1 upon R, G, and B input signals to bring the spectral characteristic of each component of the R, G, and B input signals closer to human vision characteristics.

[Equation 1]

$$\begin{pmatrix} R' \\ G' \\ B' \end{pmatrix} = \begin{pmatrix} a & b & c \\ d & e & f \\ g & h & i \end{pmatrix} \begin{pmatrix} R \\ G \\ B \end{pmatrix} \quad (1)$$

FIG. 9 is a block diagram showing the configuration of a known imaging apparatus that has a linear matrix operation function.

Referring to FIG. 9, light incident from an optical block 101 is photoelectrically converted into an analog image signal by an image pickup device 102. An A/D (analog/digital) conversion circuit 103 digitally converts the analog image signal transmitted from the image pickup device 102. A pre-correction circuit 104 performs upon the digital image signal various types of correction processing (pre-correction processing) related to the image pickup device 102 and an optical system, such as digital clamp processing for adjusting a black level, defect correction processing for correcting a signal output from a defective pixel of the image pickup device 102, and shading correction processing for correcting light falloff around a lens. A demosaic processing circuit 105 performs demosaic processing upon the signal output from the pre-correction circuit 104 so as to generate three R, G, and B plain signals (R, G, and B signals at the same spatial position) from R, G, and B signals with different spatial phases.

A linear matrix (LM) operation circuit 106 performs the above-described linear matrix operation upon the R, G, and B signals output from the demosaic processing circuit 105. Matrix coefficients used for the operation (computation) performed by the LM operation circuit 106 are set by a computation unit 107 configured with a microcontroller. The computation unit 107 sets, for the R, G, and B signals, the matrix coefficients that can bring the spectral characteristics of individual components of the image pickup device 102 closer to color matching functions approximately equal to human vision characteristics.

The R, G, and B signals output from the linear matrix operation circuit 106 are input into a white balance (WB) control circuit 108 and an integration circuit 109. The white balance control circuit 108 adjusts the gain of each component of the R, G, and B signal components. The integration circuit 109 detects the R, G, and B signals to be input into the white balance control circuit 108. The computation unit 107 controls the gain of the white balance control circuit 108 in accordance with R, G, and B integration values obtained by the integration circuit 109 so that the values of the R, G, and B signal components can become equal to each other for a white subject in an input image.

A gamma (γ) correction circuit 110 performs gamma correction upon the white balance controlled R, G, and B signals. The gamma corrected R, G, and B signals are input into a Y signal (brightness signal) processing circuit 111 and a C signal (color-difference signal) processing circuit 112, and undergo computations in each circuit, and are then separated into a Y signal, a Cr (R-Y) signal, and a Cb (B-Y) signal. The separated signals are output to a graphic processing circuit for generating an image to be displayed on a monitor, or a compression coding circuit for generating a signal to be recorded on a recording medium.

As a known imaging apparatus having such a linear matrix operation function, there is an imaging apparatus provided with a linear matrix circuit that can reduce the number of parameters and prevent circuit scale expansion by deriving, from two control parameters, six coefficients required for linear matrix conversion (see, for example, Japanese Unexamined Patent Application Publication No. 2000-50299 (paragraph Nos. 0013 to 0021 and FIG. 1)).

The linear matrix operation processing for improvement of color reproducibility causes a side effect in which noise is increased. The linear matrix operation processing is an effective method under ideal conditions of no noise. However, in a case where the linear matrix operation processing is performed so as to improve color reproducibility, the values of off-diagonal components (b, c, d, f, g, and h) among coefficients a through i shown in the above-described equation 1 sometimes become negative values. If subtraction is performed upon R, G, and B signals using such coefficients, a signal level (S component) is reduced, whereas the amount of noise (N component) is not reduced. Consequently, a signal-to-noise (S/N) ratio is undesirably reduced. In particular, since the signal level of an image is low under low illumination, image quality degradation due to a decrease in the S/N ratio is conspicuous.

A method of preventing a decrease in the S/N ratio under low illumination by setting coefficients for a linear matrix operation as a unit matrix can be considered. For example, in an example shown in FIG. 9, the computation unit 107 sets matrix coefficients as a unit matrix when a detected illumination level of image signals input into the linear matrix operation circuit 106 is low, and then sets the matrix coefficients for the linear matrix operation circuit 106. This control method is very effective, since, under low illumination, image quality degradation due to a decrease in the S/N ratio is more pronounced than color reproducibility deterioration. As will be described later, however, if matrix coefficients are changed under low illumination in a system shown in FIG. 9, the white balance of an output image is disturbed.

FIG. 10 is a timing chart showing the operation of each unit included in a known imaging apparatus when matrix coefficients are changed.

FIG. 10 shows exposure timing of the image pickup device 102, readout timing from the image pickup device 102, timing of various computations performed by the computation unit 107, and white balance control conditions each of which shows how the white balance of an output image based on a signal read out from the image pickup device 102 has been controlled. For example, it is assumed that, when the white balance of an output image is adequately controlled just before the timing T51, matrix coefficients for the linear matrix operation circuit 106 are changed by the computation unit 107 at timing T51.

Image quality control performed by changing coefficients affects an image signal output from the image pickup device 102 just after the coefficients have been changed, and R, G, and B integration values are detected from the image signal by the integration circuit 109 at timing T52. The computation unit 107 calculates a gain control value for a white balance on the basis of the detected R, G, and B integration values, and sets the calculated value for the white balance control circuit 108 at timing T53. Consequently, the white balance of an image signal output from the image pickup device 102 just after the timing T53 is adequately controlled.

If the above-described operations are performed, in a 2V-period between the timing T51 in which matrix coefficients are changed and the timing T53 in which a white balance gain is set, a white area used as a standard of reference of white balance control is shifted in the computation unit 107, whereby white-balance-disturbed images are output. Furthermore, for example, if the matrix coefficients are changed again at timing T54 after the white balance has been adequately controlled, white-balance-disturbed images are output again in a 2V-period between the timing T53 and timing T55.

FIG. 11 is a diagram showing exemplary set values of matrix coefficients corresponding to illumination levels.

shown in FIG. 11, if the matrix coefficients are continuously changed from an S/N-oriented setting to a color-reproducibility-oriented setting in the period between illumination levels L61 and L62, a white balance adequately controlled image and a white-balance-disturbed image are alternately output, that is, the color of each output image becomes unstable, in the transition period of coefficients between L61 and L62 similar to conditions shown in the period between T51 and T55 in FIG. 10. Such conditions cause significant image quality degradation, since color change due to white balance disturbance is relatively conspicuous.

As described with reference to FIGS. 9 through 11, if a linear matrix operation is performed so as to improve color reproducibility in the known imaging apparatus, the S/N ratio of an output image is decreased. If matrix coefficients are set as a unit matrix under low illumination so as to prevent the decrease in the S/N ratio, white balance control cannot follow suit every time the matrix coefficients are changed, whereby white-balance-disturbed images are output, and image quality is degraded.

It is desirable to provide an imaging apparatus capable of picking up a high-quality image with high color reproducibility and an adequate S/N ratio.

In addition, it is desirable to provide an image processor capable of outputting a high-quality image with high color reproducibility and an adequate S/N ratio.

SUMMARY OF THE INVENTION

According to an embodiment of the present invention, there is provided an imaging apparatus for imaging an image using a solid-state image pickup device. The imaging apparatus includes a first linear matrix operation unit configured to perform matrix conversion upon a color component of an image signal obtained by imaging using coefficients capable of improving color reproducibility; a second linear matrix operation unit configured to perform matrix conversion upon the color component using coefficients capable of achieving noise component reduction; a signal combining unit configured to combine image signals output from a plurality of signal processing systems each of which includes one of the first linear matrix operation unit or the second linear matrix operation unit; and a combination ratio setting unit configured to set a combination ratio to be used by the signal combining unit so that, when a subject is bright, an image signal output from the signal processing system that includes the first linear matrix operation unit can be combined in an amount larger than the image signals output from the other signal processing systems.

In the above-described imaging apparatus, an image signal in which the color reproducibility has been improved by the first linear matrix operation unit and an image signal in which noise reduction has been achieved by the second linear matrix operation unit are input from corresponding signal processing systems into the signal combining unit. In the signal combining unit for which the combination ratio setting unit sets a combination ratio, when a subject is bright, the image signal with the improved color reproducibility which has been output from the signal processing system that includes the first linear matrix operation unit is combined in an amount larger than the image signals of the other signal processing systems. Consequently, if a subject is bright and an image with an adequate S/N ratio is imaged, an image in which the color reproducibility has been significantly improved is output, and if a subject is dark and an image with an inadequate S/N ratio is imaged, an image in which noise reduction has been achieved and the S/N ratio has been improved is output.

According to the imaging apparatus according to an embodiment of the present invention, if a subject is bright and an image with an adequate S/N ratio is imaged, an image in which the color reproducibility has been significantly improved is output, and if a subject is dark and an image with an inadequate S/N ratio is imaged, an image in which noise reduction has been achieved and the S/N ratio has been improved is output. Accordingly, a high-quality image with the high color reproducibility and the adequate S/N ratio can be imaged irrespective of the brightness of a subject.

DETAILED DESCRIPTION

Embodiments of the present invention will be described in detail with reference to the accompanying drawings.

First Embodiment

Figure 1:
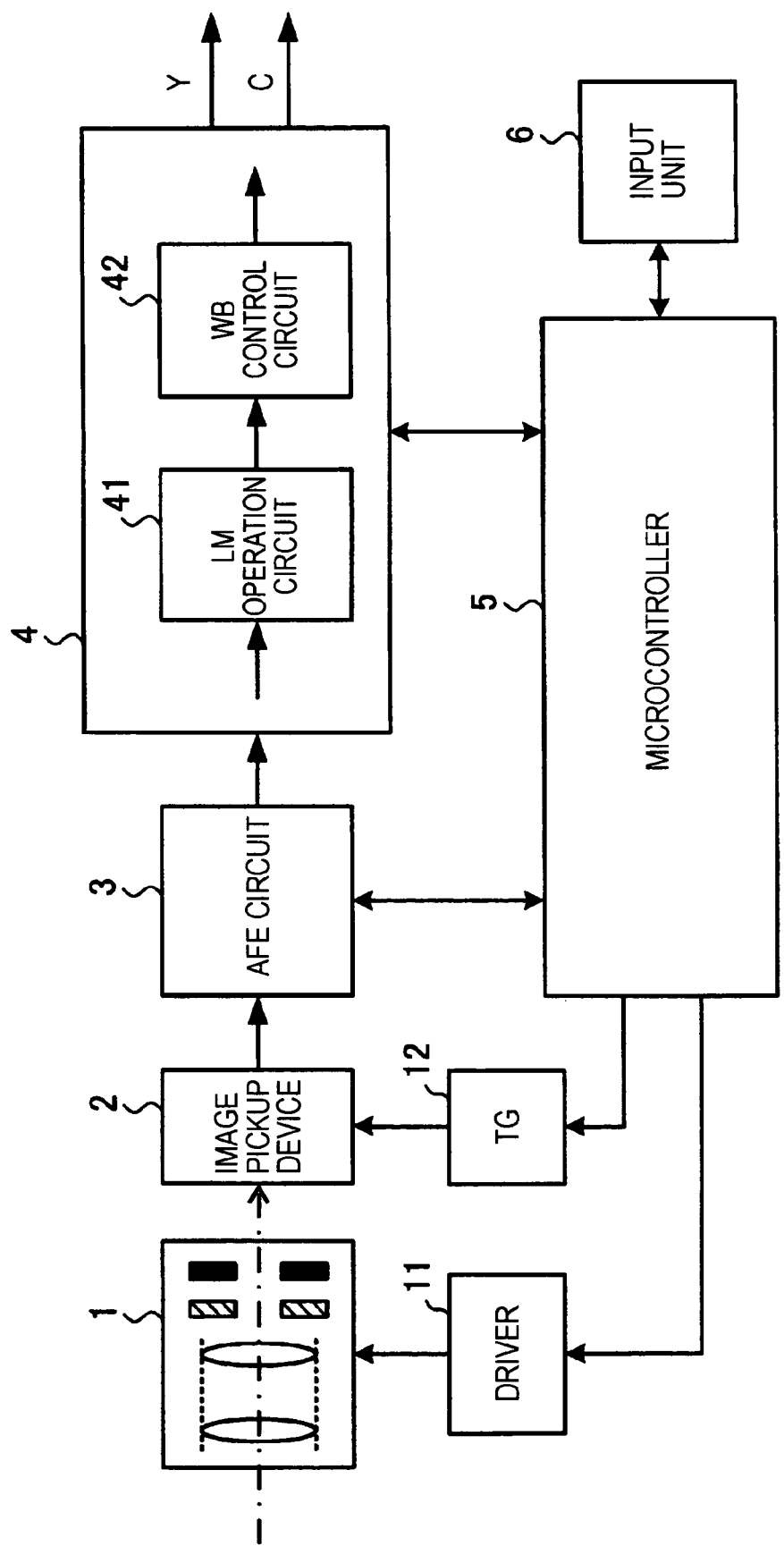
FIG. 1 is a block diagram showing the configuration of an imaging apparatus according to a first embodiment of the present invention.

FIG. 1 is a block diagram showing the configuration of an imaging apparatus according to the first embodiment of the present invention.

The imaging apparatus shown in FIG. 1 is provided with an optical block 1, an image pickup device 2, an AFE (Analog Front End) circuit 3, a camera signal processing circuit 4, a microcontroller 5, an input unit 6, a driver 11 for driving various mechanisms included in the optical block 1, and a timing generator (TG) 12 for driving the image pickup device 2.

The optical block 1 is provided with a lens for focusing light from a subject onto the image pickup device 2, a driving mechanism for moving the lens to cause the lens to perform focusing and zooming operations, a mechanical shutter, and a diaphragm. The driver 11 performs drive control upon each mechanism included in the optical block 1 in accordance with a control signal transmitted from the microcontroller 5.

The image pickup device 2 is a CCD (Charge Coupled Device)-type or CMOS (Complementary Metal Oxide Semiconductor)-type solid-state image pickup device, and is driven in accordance with a timing signal output from the timing generator 12, and converts light incident from a subject into an electric signal. The timing generator 12 outputs a timing signal under the control of the microcontroller 5.

The AFE circuit 3 performs sample hold processing upon an analog image signal output from the image pickup device 2 by performing CDS (Correlated Double Sampling) processing so as to maintain an adequate S/N ratio, and controls the gain of the analog image signal by performing AGC (Auto Gain Control) processing under the control of the microcontroller 5, and performs A/D conversion upon the analog image signal to output a digital image signal.

The camera signal processing circuit 4 performs upon the image signal transmitted from the AFE circuit 3 some of or all of various types of camera signal processing such as AF (Auto Focus) processing, AE (Auto Exposure) processing, and white balance control. The camera signal processing circuit 4 according to this embodiment is provided with a linear matrix (LM) operation circuit 41 for performing a matrix operation upon each color component of the input image signal and a white balance (WB) control circuit 42 for controlling the gain of each color component.

The microcontroller 5 is configured with a CPU (Central Processing Unit), ROM (Read-Only Memory), RAM (Random Access Memory), etc., and centrally controls units included in the imaging apparatus by executing programs stored in the ROM, and performs various computations required for the control operations. The input unit 6 includes an operation key, a dial, a lever, etc. for receiving operation inputs from a user, and outputs control signals corresponding to the operation inputs to the microcontroller 5.

In this imaging apparatus, light received by the image pickup device 2 is photoelectrically converted into a signal, and the converted signal is provided to the AFE circuit 3. The AFE circuit 3 performs the CDS processing and the AGC processing upon the provided signal, and converts the processed signal into a digital signal. The camera signal processing circuit 4 performs image quality correction processing upon the digital image signal transmitted from the AFE circuit 3, and finally converts the processed signal into a Y signal and a C signal, and then outputs the converted signals.

The image data output from the camera signal processing circuit 4 is provided to a graphic interface circuit (not shown), and is then converted into an image signal for display, whereby a camera-through image is displayed on a monitor (not shown) such as an LCD (Liquid Crystal Display). When an image recording instruction input by a user using the input unit 6 is transmitted to the microcontroller 5, image data from the camera signal processing circuit 4 is transmitted to a CODEC (enCOder/DECoder) (not shown). The CODEC performs predetermined compression coding processing upon the transmitted image data and stores the compression-coded image data on a storage medium (not shown). In the case of recording a still image, image data of one frame is transmitted from the camera signal processing circuit 4 to the CODEC. In the case of recording a moving image, processed image data is continuously transmitted to the CODEC.

Figure 2:
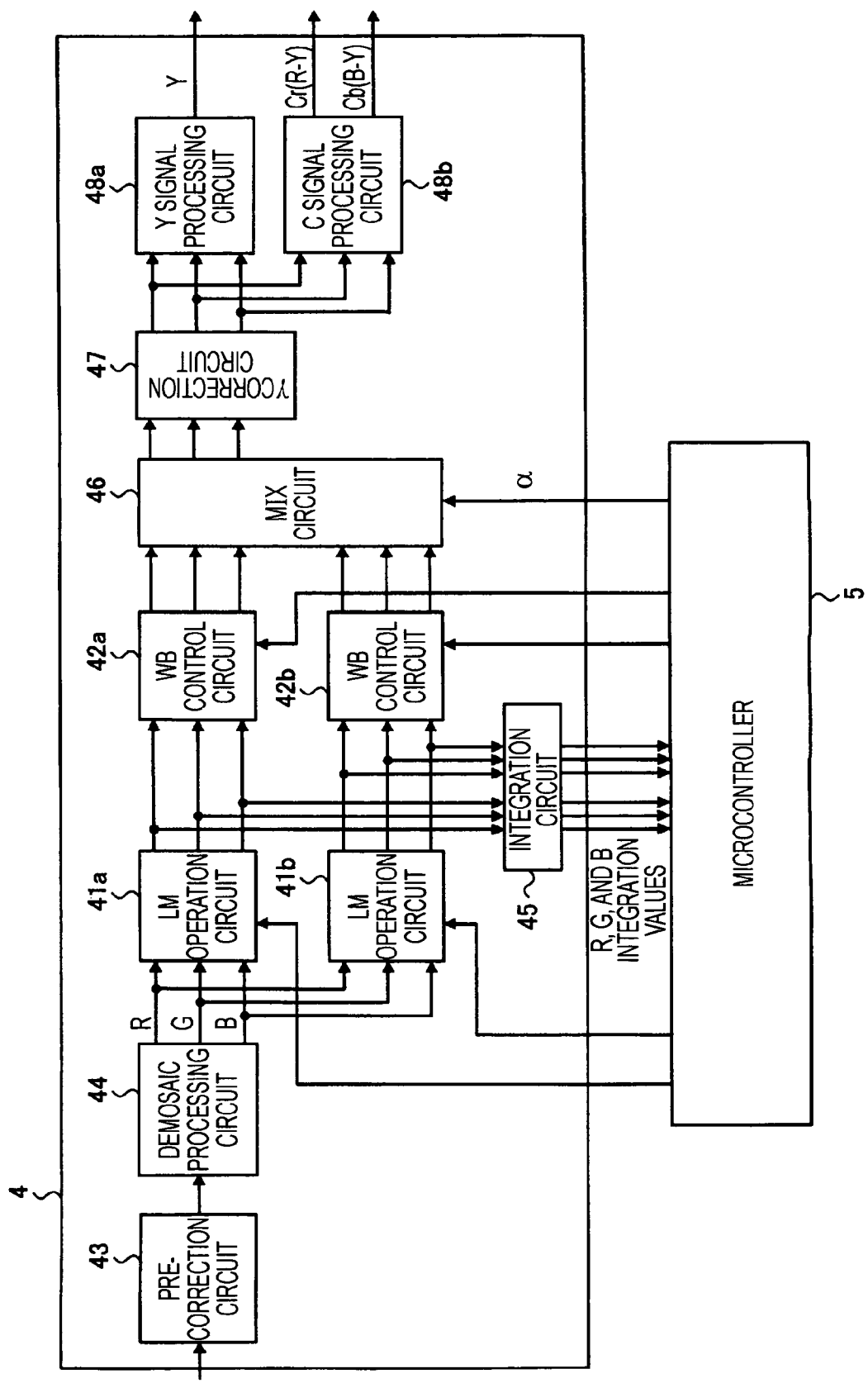
FIG. 2 is a block diagram showing the internal configuration of a camera signal processing circuit according to the first embodiment of the present invention.

FIG. 2 is a block diagram showing the internal configuration of a camera signal processing circuit.

As shown in FIG. 2, the camera signal processing circuit 4 is provided with linear matrix operation circuits 41a and 41b, white balance control circuits 42a and 42b, a pre-correction circuit 43, a demosaic processing circuit 44, an integration circuit 45, a MIX (combining) circuit 46, a γ correction circuit 47, a Y signal processing circuit 48a, and a C signal processing circuit 48b.

The pre-correction circuit 43 performs upon a digital image signal transmitted from the AFE circuit 3 various types of correction processing related to the image pickup device 2 and an optical system such as digital clamp processing for adjusting a black level, defect correction processing for correcting a signal output from a defective pixel of the image pickup device 2, and shading correction processing for correcting light falloff around a lens.

The demosaic processing circuit 44 performs demosaic processing upon the image signal output from the pre-correction circuit 43 so as to generate three R, G, and B plain signals (R, G, and B signals at the same spatial position) from R, G, and B signals with different spatial phases.

At a subsequent stage of the demosaic processing circuit 44, a first signal processing system composed of the linear matrix operation circuit 41a and the white balance control circuit 42a and a second signal processing system composed of the linear matrix operation circuit 41b and the white balance control circuit 42b are disposed in parallel. The linear matrix operation circuits 41a and 41b perform matrix operations corresponding to the following equations 2 and 3 upon R, G, and B signals transmitted from the demosaic processing circuit 44, respectively.

[Equation 2]

$$\begin{pmatrix} R_{LM1} \\ G_{LM1} \\ B_{LM1} \end{pmatrix} = \begin{pmatrix} a1 & b1 & c1 \\ d1 & e1 & f1 \\ g1 & h1 & i1 \end{pmatrix} \begin{pmatrix} R \\ G \\ B \end{pmatrix} \quad (2)$$

$$\begin{pmatrix} R_{LM2} \\ G_{LM2} \\ B_{LM2} \end{pmatrix} = \begin{pmatrix} a2 & b2 & c2 \\ d2 & e2 & f2 \\ g2 & h2 & i2 \end{pmatrix} \begin{pmatrix} R \\ G \\ B \end{pmatrix} \quad (3)$$

The microcontroller 5 sets different values to the matrix coefficients a1 through i1 of the linear matrix operation circuit 41a and the matrix coefficients a2 through i2 of the linear matrix operation circuit 41b. By setting the values of individual matrix coefficients as above, correction for improving color reproducibility is performed in the first signal processing system, and correction for reducing noise is performed in the second signal processing system.

A linear matrix operation circuit 41a performs the correction for improving color reproducibility. Accordingly, matrix coefficients that can bring the spectral characteristics of individual R, G, and B components of the image pickup device 2 closer to color matching functions approximately equal to human vision characteristics are set for the linear matrix operation circuit 41a. At that time, the value of at least one of a plurality of off-diagonal components (b1, c1, d1, f1, g1, and h1) among matrix coefficients sometimes becomes a negative value. On the other hand, the linear matrix operation circuit 41b performs the correction to obtain an adequate S/N ratio. Accordingly, matrix coefficients capable of being set as, for example, a unit matrix are set for the linear matrix operation circuit 41b.

Upon receiving image signals output from the linear matrix operation circuits 41a and 41b, the white balance control circuits 42a and 42b control the gains of individual R, G, and B components in accordance with gain control values acquired from the microcontroller 5, respectively.

The integration circuit 45 integrates image signals to be input into the white balance control circuits 42a and 42b, and outputs integration values to the microcontroller 5. The microcontroller 5 controls the gains of the white balance control circuits 42a and 42b in accordance with the integration values acquired from the integration circuit 45 so that the values of individual R, G, and B components can become equal to each other for a white subject in an input image. In the computation of the gain control value, for example, on the basis of an empirical prediction that a highlight area on a screen is likely to have a white color, a gain control value that can cause the amounts of individual R, G, and B components included in the highlight area to be equal to each other is computed. By performing such a computation, different gain control values are set for the white balance control circuits 42a and 42b.

The MIX circuit 46 combines the image signal output from the first signal processing system (that is, output from the white balance control circuit 42a) with the image signal output from the second signal processing system (that is, output from the white balance control circuit 42b) on a color component-by-color component basis in accordance with a combination ratio α specified by the microcontroller 5. If the image signals output from the white balance control circuits 42a and 42b are ($R_{WB1}$, $G_{WB1}$, $B_{WB1}$) and ($R_{WB2}$, $G_{WB2}$, $B_{WB2}$), respectively, the MIX circuit 46 combines these signals in accordance with the following equations 4 through 6 in which 0<α<1.

[Equation 4]

$$R_{MIX} = \alpha \times R_{WB1} + (1-\alpha) \times R_{WB2} \quad (4)$$

[Equation 5]

$$G_{MIX} = \alpha \times G_{WB1} + (1-\alpha) \times G_{WB2} \quad (5)$$

[Equation 6]

$$B_{MIX} = \alpha \times B_{WB1} + (1-\alpha) \times B_{WB2} \quad (6)$$

The γ correction circuit 47 performs γ correction upon the image signal output from the MIX circuit 46. The Y signal processing circuit 48a and the C signal processing circuit 48b perform Y signal processing and C signal processing upon the γ-corrected image signal, respectively, to generate a Y signal, a Cr (R-Y) signal, and a Cb (B-Y) signal. For example, if the γ-corrected image signal is ($R_{IN}$, $G_{IN}$, $B_{IN}$), the Y signal processing circuit 48a generates the Y signal in accordance with the following equation 7, and the C signal processing circuit 48b generates the Cr (R-Y) signal and the Cb (B-Y) signal in accordance with the following equations 8 and 9, respectively.

[Equation 7]

$$Y = 0.3 R_{IN} + 0.6 B_{IN} + 0.1 G_{IN} \quad (7)$$

[Equation 8]

$$Cr(R\text{-}Y) = 0.7 R_{IN} - 0.6 G_{IN} - 0.1 B_{IN} \quad (8)$$

[Equation 9]

$$Cb(B\text{-}Y) = -0.3 R_{IN} - 0.6 G_{IN} + 0.9 B_{IN} \quad (9)$$

Figure 3:
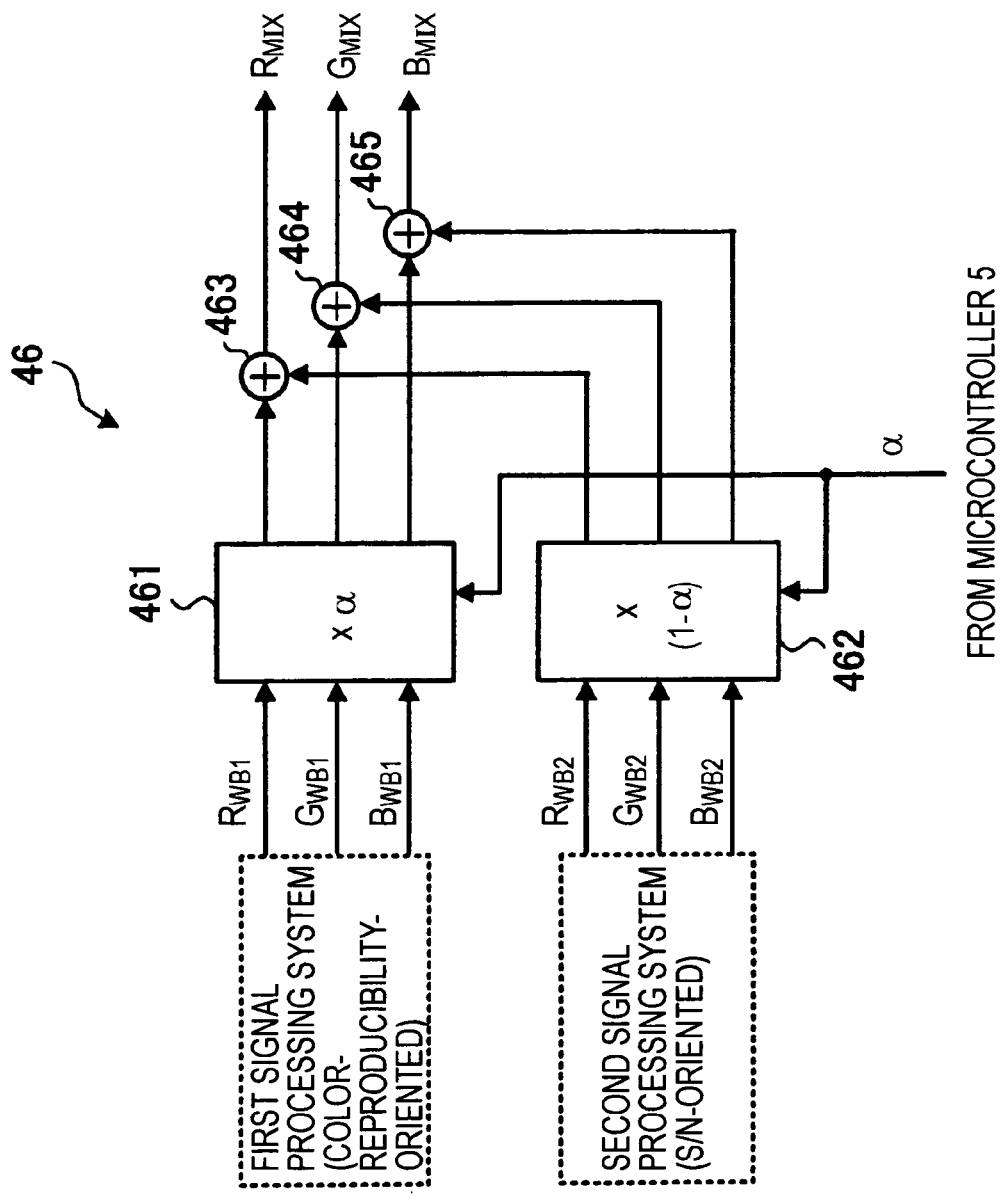
FIG. 3 is a diagram showing an exemplary internal configuration of a MIX circuit.

FIG. 3 is a diagram showing the internal configuration of a MIX circuit.

The MIX circuit 46 having the configuration shown in FIG. 3 can combine image signals in accordance with the above equations 4 through 6. Referring to FIG. 3, a multiplication circuit 461 individually multiplies the image signals ($R_{WB1}$, $G_{WB1}$, $B_{WB1}$) output from the first signal processing system by the combination ratio α specified by the microcontroller 5. A multiplication circuit 462 individually multiplies the image signals ($R_{WB2}$, $G_{WB2}$, $B_{WB2}$) output from the second signal processing system by the value of (1−α). Adding circuits 463 through 465 add the image signals output from the multiplication circuits 461 and 462 on a color component-by-color component basis.

Thus, the first and second signal processing systems each of which includes the linear matrix operation circuit and the white balance control circuit are disposed in parallel, and image signals output from the first and second signal processing systems are combined at a predetermined ratio by the MIX circuit 46. Different matrix coefficients for achieving good color reproducibility and an adequate S/N ratio are individually set for the signal processing systems. Subsequently, an image signal output from one signal processing system which can be considered to have a quality higher than that of an image signal output from the other signal processing system is combined in an amount larger than that of the image signal output from the other signal processing system in accordance with the state of a subject. Consequently, a high-quality image can be output.

For example, if matrix coefficients among which off-diagonal components (b1, c1, d1, f1, g1, and h1) have negative values are set for the linear matrix operation circuit 41a, a high-quality image can be obtained when a bright subject is imaged. Accordingly, in this case, by setting a high value to the combination ratio α, a signal output from the first signal processing system may be combined in an amount larger than that of a signal output from the second signal processing. However, when a subject is dark and a number of noise components occur, the above-described linear matrix operation circuit 41a increases the number of noise components. Accordingly, if a dark subject is imaged, a high-quality image in which noise has been reduced can be obtained by setting a low value to the combination ratio α so that an image signal whose image quality has been corrected for noise reduction can be combined in an amount larger than that of the other image signal.

In this embodiment, the combination ratio α for the MIX circuit 46 is automatically controlled in accordance with an illumination level calculated on the basis of a detection value from an input image signal and a current limited amount of exposure, whereby a high-quality image can always be output.

The illumination level can be calculated on the basis of a brightness level based on a current input image signal and the limited amount of exposure set for an exposure control mechanism included in this imaging apparatus. The limited amount of exposure set for the exposure control mechanism is obtained on the basis of the control values of the aperture of a diaphragm included in the optical block 1, the shutter speed of a mechanical shutter or the electronic shutter of the image pickup device 2, and the AGC gain amount of the AFE circuit 3. As these control values, values that had been calculated by the microcontroller 5 for an AE control computation can be used.

For example, in the manufacturing process of this imaging apparatus, a reference chart of achromatic colors for which a reflection factor at a brightness level is constant is imaged under a light source of a specific illumination level at which spectral distribution is approximately flat. Acquired control values of the aperture of a diaphragm, a shutter speed, and an AGC gain amount, and the acquired detection value of the brightness level are stored in advance as data in a reference state. Subsequently, control values the same as above and the detection value of the brightness level are similarly acquired when a subject is imaged, and the differences between the control values and detection value acquired in the reference state and those acquired from the imaging of the subject are acquired. After the unit of these differences is transformed into the unit of EV, and all differences are added or multiplied. Consequently, the illumination level can be predicted.

In this embodiment, the brightness level used for calculating the illumination level is calculated on the basis of an integration value that is acquired by causing an image signal output from the linear matrix operation circuit 41a or 41b to be detected by the integration circuit 45. It is normally desirable that an image signal that has not undergone color control processing such as a linear matrix operation or white balance control be detected for obtaining the brightness level. However, a brightness level fluctuation quantity of an image signal is relatively small even if a linear matrix operation is performed upon the image signal. Accordingly, sufficiently accurate detection of a brightness level for practical applications can be achieved from the image signal that has undergone the linear matrix operation. In particular, since the brightness level fluctuation quantity of an image signal output from the linear matrix operation circuit 41b, in which matrix coefficients have been set as a unit matrix, is much smaller, it is desirable that a detection value based on the image signal output from this circuit be used for obtaining the brightness level.

In addition, the detection value based on an image signal upon which a linear matrix operation has been performed is also used for obtaining the gain control value for the white balance control circuit 42a or 42b. That is, the same detection value can be used for calculating the gain control value and the combination ratio α. This can effectively downsize a circuit and reduce a processing load on the microcontroller 5.

Figure 4:
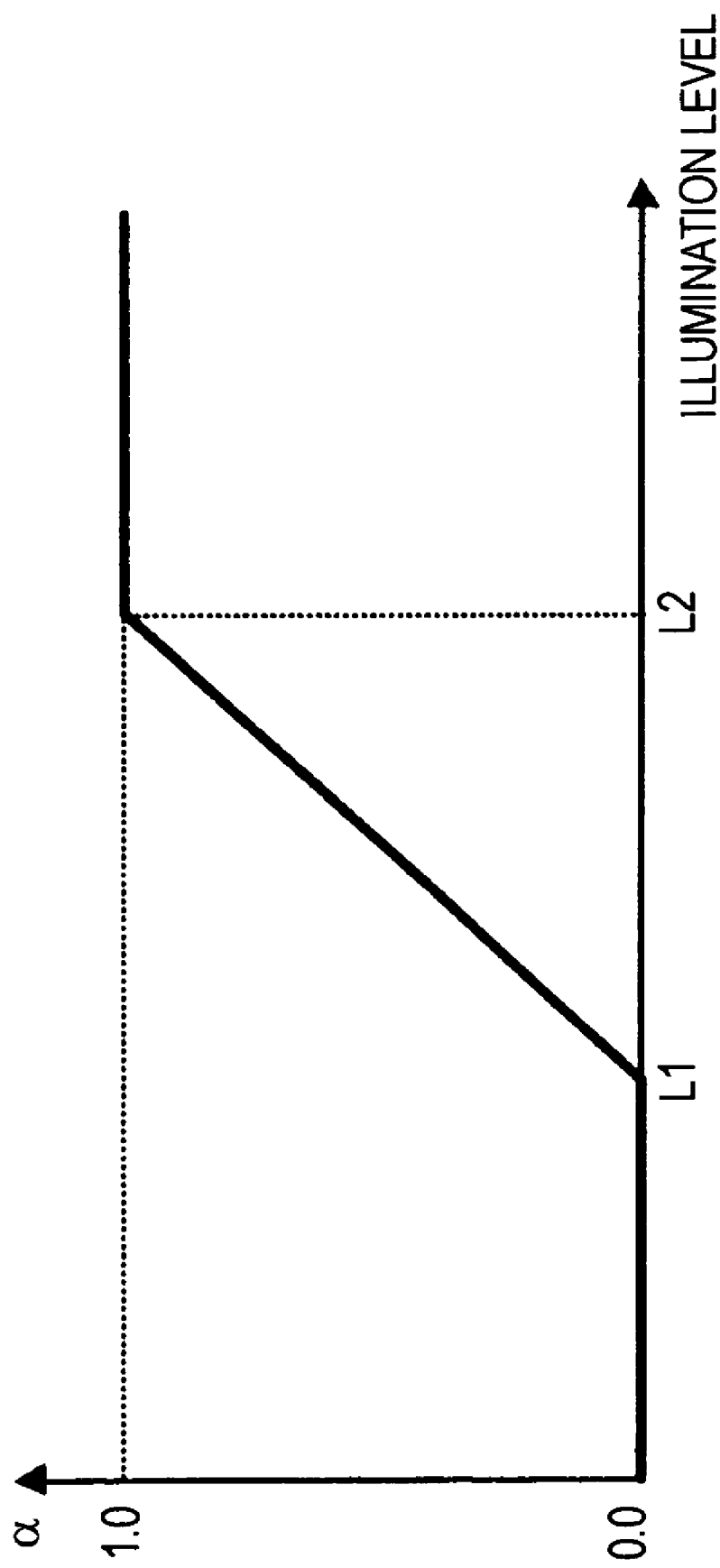
FIG. 4 is a graph showing an exemplary setting of a combination ratio α according to the first embodiment of the present invention.

FIG. 4 is a graph showing an exemplary setting of the combination ratio α.

As shown in FIG. 4, if the value of the calculated illumination level is higher than a threshold value L2, the microcontroller 5 determines that sufficient incident light and a noiseless image can be obtained, and sets the value of the combination ratio α to one so that only an image signal corrected by the first signal processing system can be output. On the other hand, if the value of the calculated illumination level is lower than a threshold value L1, the microcontroller 5 determines that incident light is extremely small and a noise component is markedly larger than a signal component, and sets the value of the combination ratio α to zero so that only an image signal corrected by the second signal processing system can be output. If the value of the obtained illumination level is a value between the threshold values L1 and L2, for example, the microcontroller 5 linearly increases the value of the combination ratio α in accordance with an increase in the illumination level. Alternatively, the microcontroller 5 may incrementally set the value of the combination ratio α in accordance with the illumination level.

Thus, when the illumination level is high, the image signal corrected by the first signal processing system is combined in an amount larger than that of the other image signal and is then output, on the other hand, when the illumination level is low, the image signal corrected by the second signal processing system is combined in an amount larger than that of the other image signal and is then output. Consequently, the demerit of the linear matrix operation circuit 41a which occurs in the color-reproducibility-oriented setting of the combination ratio α can be prevented from significantly affecting image quality, and a noiseless and high-quality image with high color reproducibility can always be output irrespective of the brightness of a subject.

Figure 5:
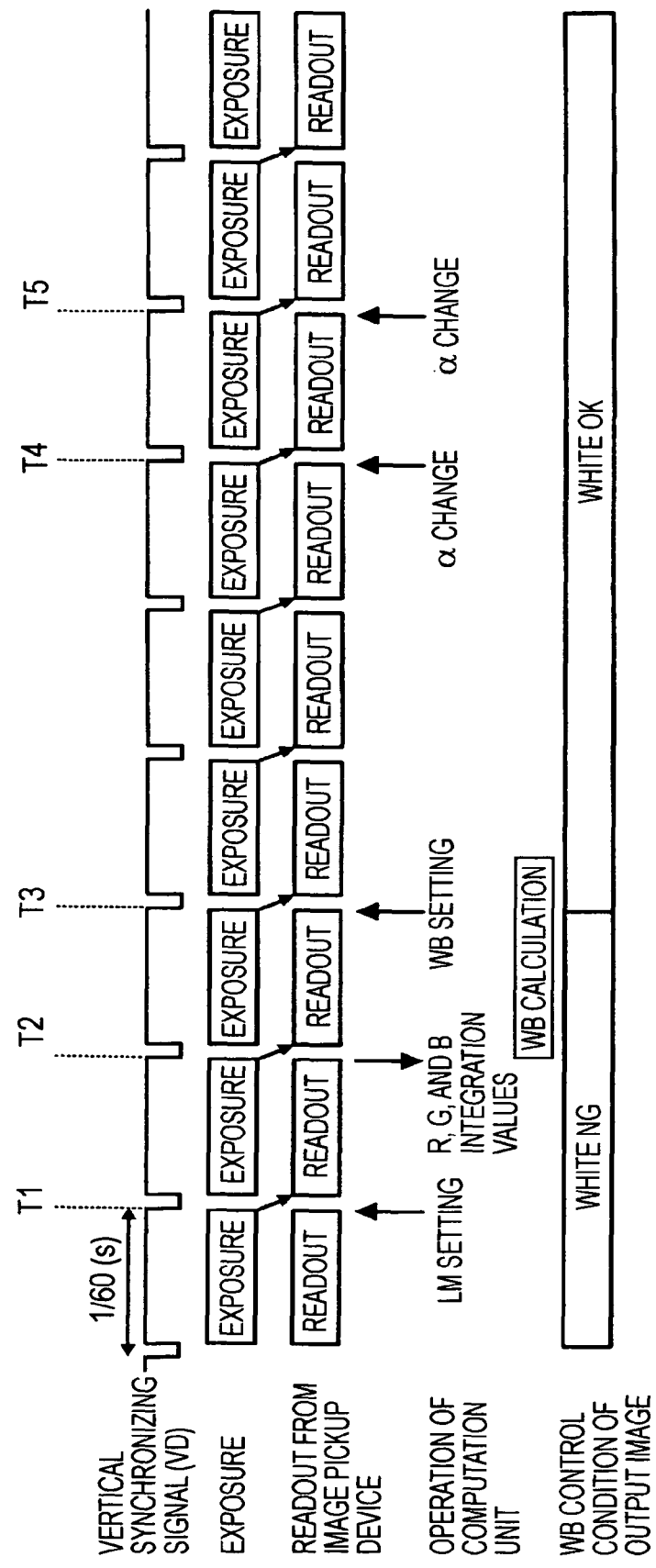
FIG. 5 is a timing chart showing the operation of each unit included in an imaging apparatus when matrix coefficients are changed.

FIG. 5 is a timing chart showing the operation of each unit included in an imaging apparatus when matrix coefficients are changed.

FIG. 5 shows exposure timing of the image pickup device 2, readout timing from the image pickup device 2, timing of various computations performed by the microcontroller 5, and white balance control conditions each of which shows how the white balance of an output image based on a signal read out from the image pickup device 2 has been controlled.

In this embodiment, the values of matrix coefficients for the linear matrix operation circuits 41a and 41b of the first and second signal processing systems are basically set to fixed values at the time of initial setting by the microcontroller 5. For example, if matrix coefficients are initially set for the linear matrix operation circuits 41a and 41b at timing T1, image quality control performed by setting matrix coefficients affects an image signal output from the image pickup device 2 just after the coefficients have been set, and integration values are detected from the output image signal by the integration circuit 45 at timing T2. The microcontroller 5 individually computes control values of white balance gains for signal processing systems on the basis of the detection values, and sets the computed control values for the white balance control circuits 42a and 42b at timing T3. Consequently, the white balance of an image signal output from the image pickup device 2 just after the timing T3 is adequately controlled.

In the above-described processing sequence, a white area used as a standard of reference of a white balance control is shifted at the time of the initial setting processing for setting matrix coefficients, whereby a white-balance-disturbed images are output. However, this does not pose a particular problem for practical applications, since the white area shifting occurs only when the initial setting is performed. On the other hand, after the initial setting has been finished (that is, after the timing T3), the setting itself of the matrix coefficients is not changed in the linear matrix operation circuits 41a and 41b even if the illumination level is changed, and therefore the white area shifting that occurs due to the change of the setting does not occur, whereby a white balance adequately controlled image is always output from each signal processing system. As the MIX circuit 46 only combines the white balance adequately controlled image signals, the white balance of an image signal output from the MIX circuit 46 is always adequately controlled. Accordingly, even if the combination ratio α is changed in accordance with a change in the illumination level, for example, at timing T4 or T5, the white balance of an output image is not disturbed.

Thus, according to the imaging apparatus according to this embodiment, by combining, at a predetermined ratio, image signals upon which linear matrix operations have been performed using different matrix coefficients that are changed in accordance with a change in subject brightness, the color reproducibility and S/N ratio can be improved. Furthermore, the white balance of an output image can always be adequately maintained in accordance with the change in subject brightness. White balance disturbance is conspicuous when a user visually checks an output image. However, according to this embodiment, an imaging apparatus capable of significantly and effectively improving image quality can be achieved.

Second Embodiment

Figure 6:
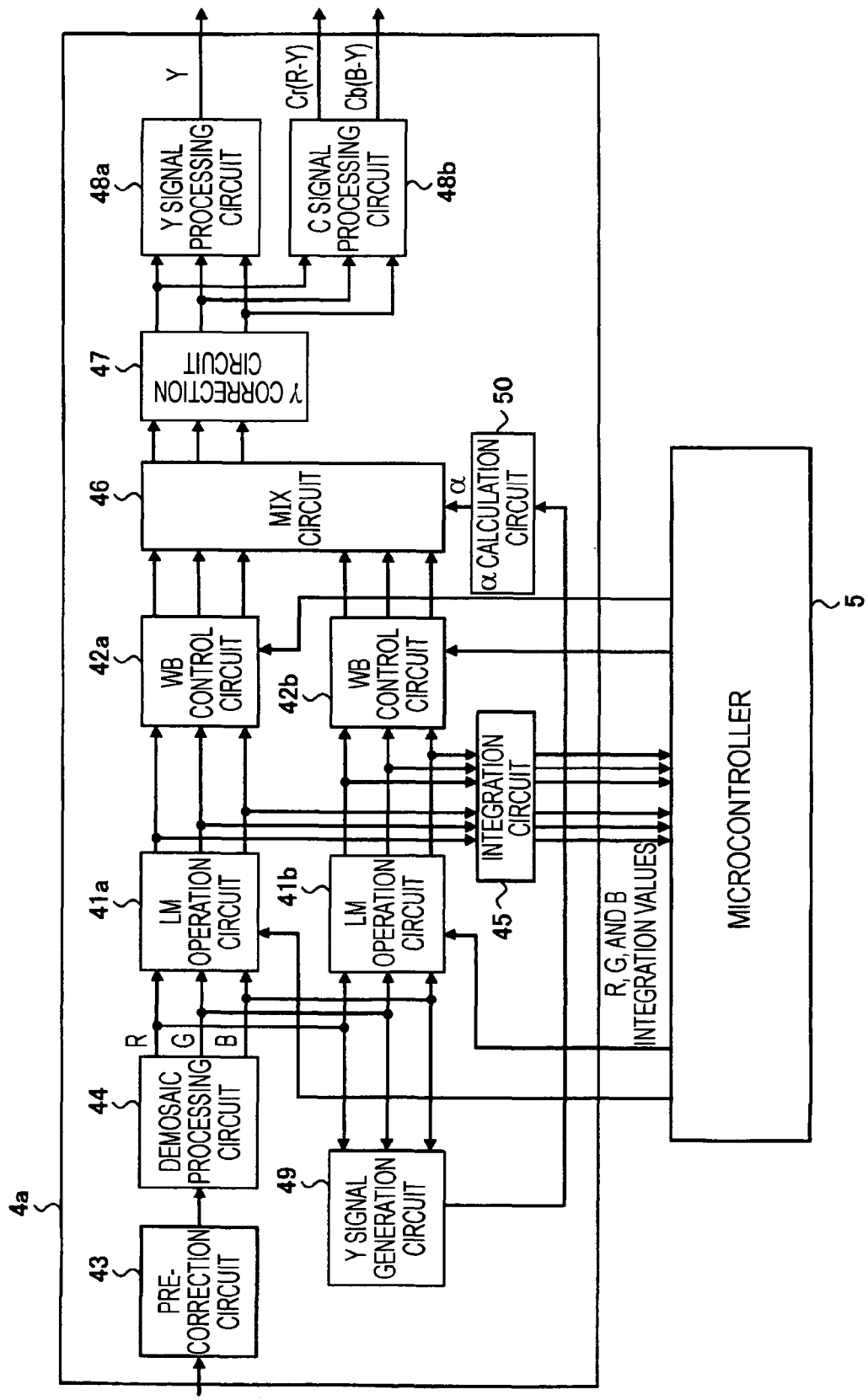
FIG. 6 is a block diagram showing the internal configuration of a camera signal processing circuit according to a second embodiment of the present invention.

FIG. 6 is a block diagram showing the internal configuration of a camera signal processing circuit according to the second embodiment of the present invention. In FIG. 6, the same reference numerals are used for functions similar to those shown in FIG. 2 to avoid repeated description.

Like the camera signal processing circuit according to the first embodiment shown in FIG. 2, a camera signal processing circuit 4a has a basic configuration that includes two signal processing systems for performing linear matrix operations and white balance control and the MIX circuit 46 for combining image signals output from the signal processing systems. The difference between the first and second embodiments is that the function of calculating the combination ratio α to be set for the MIX circuit 46 is achieved by a Y signal generation circuit 49 and an α calculation circuit 50 instead of the microcontroller 5.

The Y signal generation circuit 49 generates a Y signal from an image signal output from the demosaic processing circuit 44 using the above-described equation 7 on a pixel-by-pixel basis, and outputs the signal level of the generated Y signal to the α calculation circuit 50. The α calculation circuit 50 calculates a combination ratio α in accordance with the brightness level that is input on a pixel-by-pixel basis, and sets the calculated combination ratio α for the MIX circuit 46.

Figure 7:
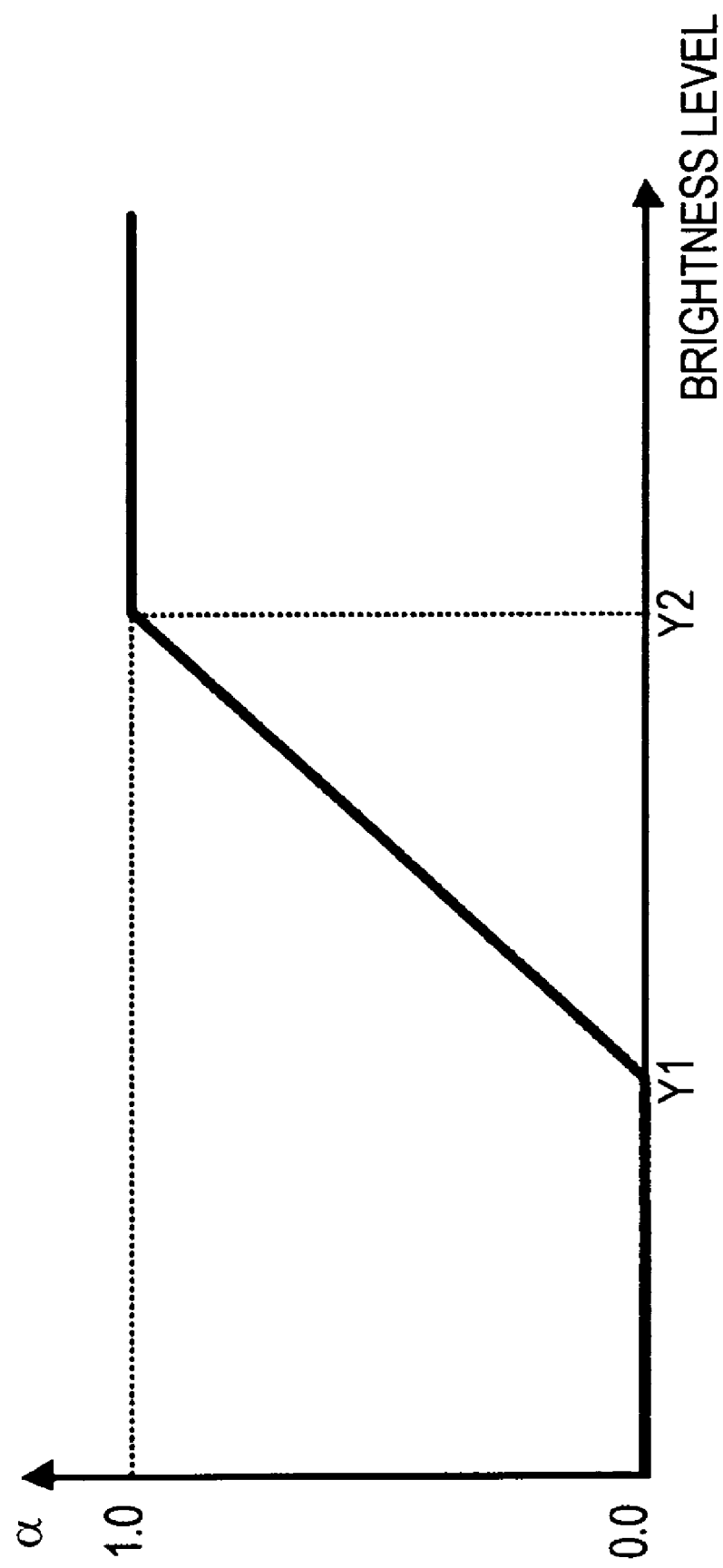
FIG. 7 is a graph showing an exemplary setting of a combination ratio α performed by an a calculation circuit.

FIG. 7 is a graph showing an exemplary setting of a combination ratio α performed by an α calculation circuit.

Like the first embodiment, the setting of the combination ratio α is similarly performed, that is, if a bright image of a relatively small noise level is imaged, the value of the combination ratio α is set to a high value, on the other hand, if a dark image in which noise is conspicuous is imaged, the value of the combination ratio α is set to a low value. More specifically, for example, as shown in FIG. 7, if the value of a brightness level detected by the Y signal generation circuit 49 is higher than a threshold value Y2, the value of the combination ratio α is set to one so that only an image signal corrected by the first signal processing system can be output. On the other hand, if the value of the brightness level detected by the Y signal generation circuit 49 is lower than a threshold value Y1, the value of the combination ratio α is set to zero so that only an image signal corrected by the second signal processing system can be output. If the value of the detected brightness level is a value between the threshold values Y1 and Y2, the value of the combination ratio α is linearly increased in accordance with an increase in the brightness level. Alternatively, the value of the combination ratio α may be incrementally set in accordance with the brightness level.

Here, in the above-described first embodiment, the combination ratio α is set for the MIX circuit 46 in accordance with an illumination level that is obtained every 1V-period, and therefore, only correction using the same setting can be performed on a single entire screen. On the other hand, in the second embodiment, the brightness level is detected on a pixel-by-pixel basis in accordance with an obtained image signal, and the combination ratio α can be changed on a pixel-by-pixel basis for the MIX circuit 46 in accordance with the detection result. Accordingly, it is possible to determine which correction of color-reproducibility-oriented correction or noise-reduction-oriented correction should be performed on a pixel-by-pixel basis, and to adequately perform correction upon each pixel on a single image. For example, when a high-contrast subject is imaged, the color-reproducibility-oriented correction can be performed upon a bright area that has an adequate S/N ratio by setting the value of the combination ratio α to a high value, and the noise-reduction-oriented correction can be performed upon a dark area by setting the value of the combination ratio α to a low value. Thus, a high-quality image with further improved color reproducibility and lower noise can be obtained.

Third Embodiment

Figure 8:
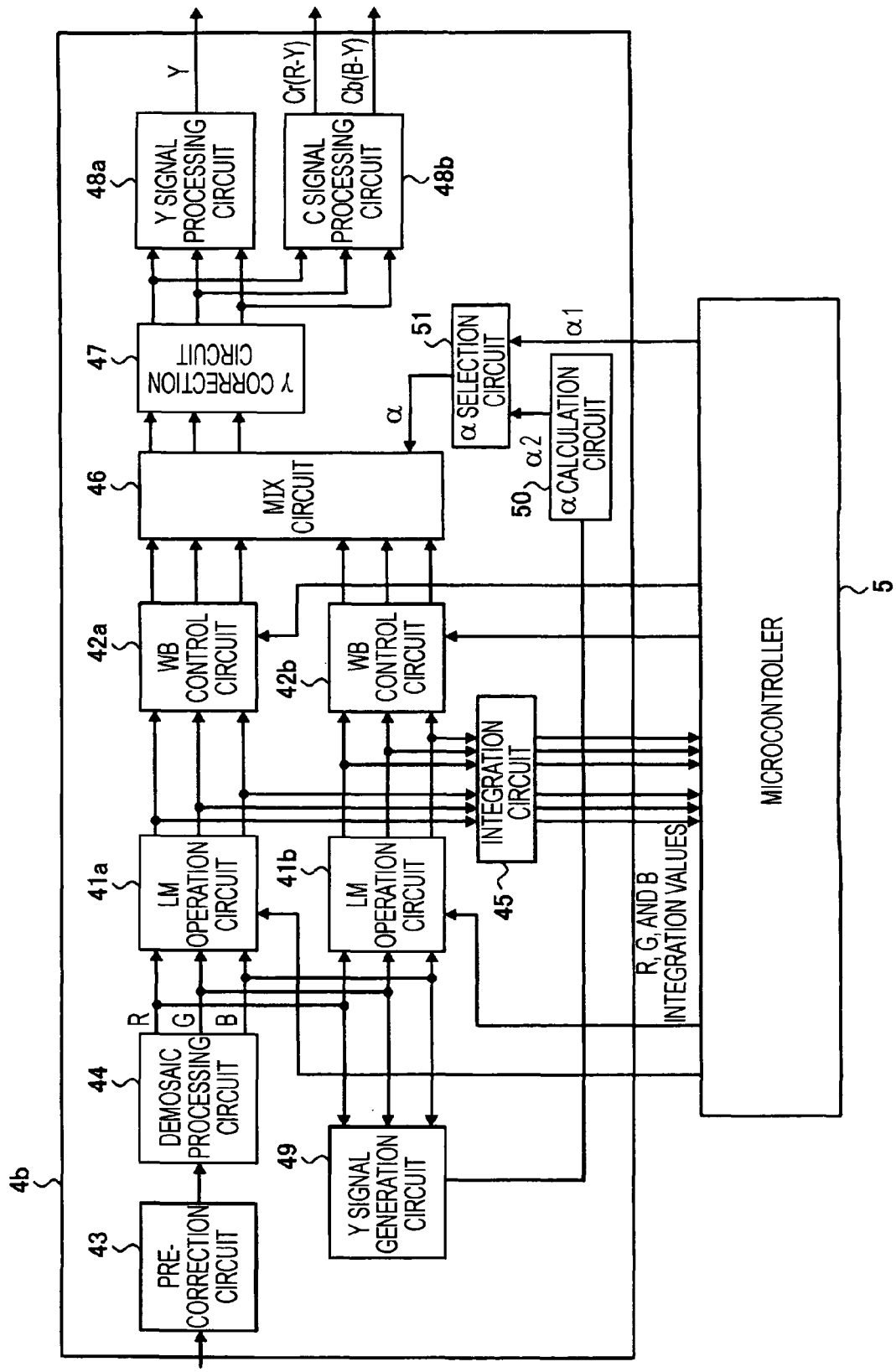
FIG. 8 is a block diagram showing the internal configuration of a camera signal processing circuit according to a third embodiment of the present invention.
Figure 9:
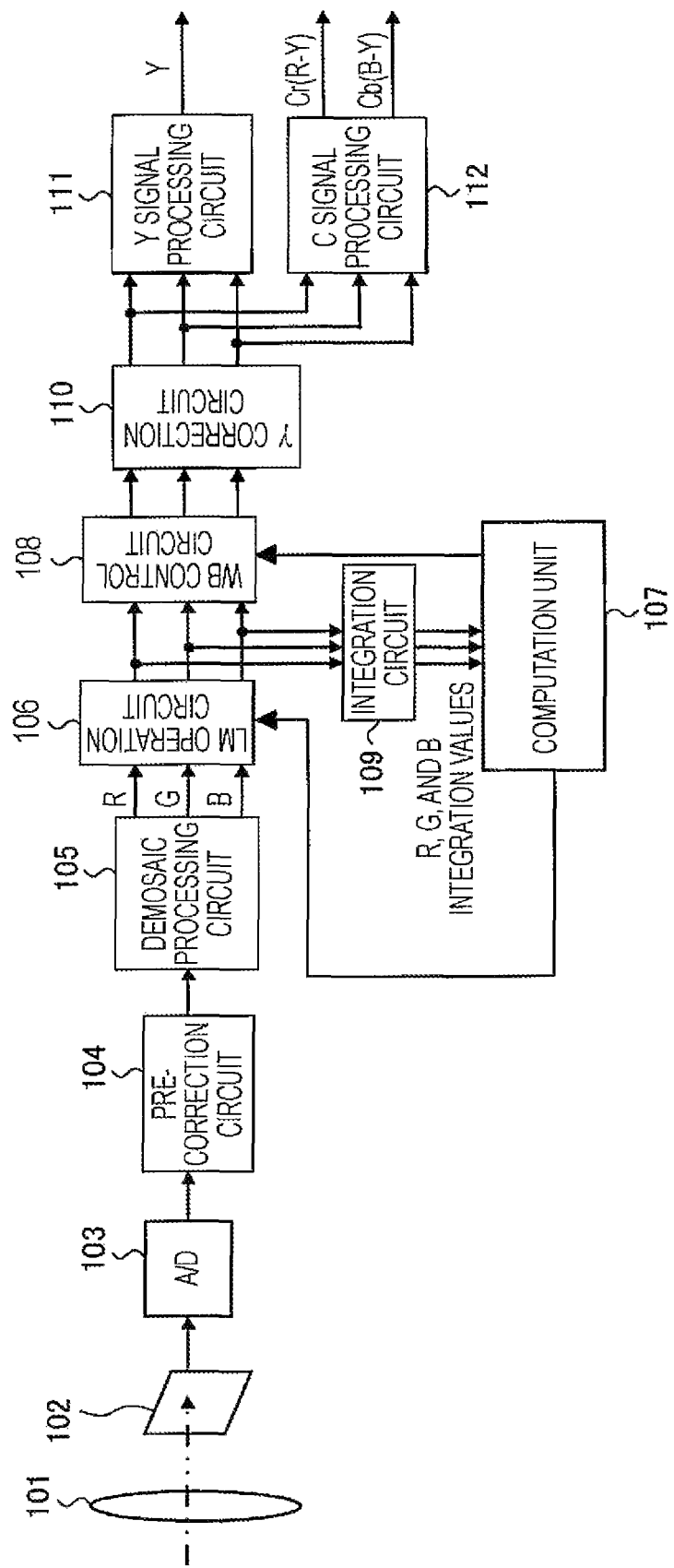
FIG. 9 is a block diagram showing the configuration of a known imaging apparatus that has a linear matrix operation function.
Figure 10:
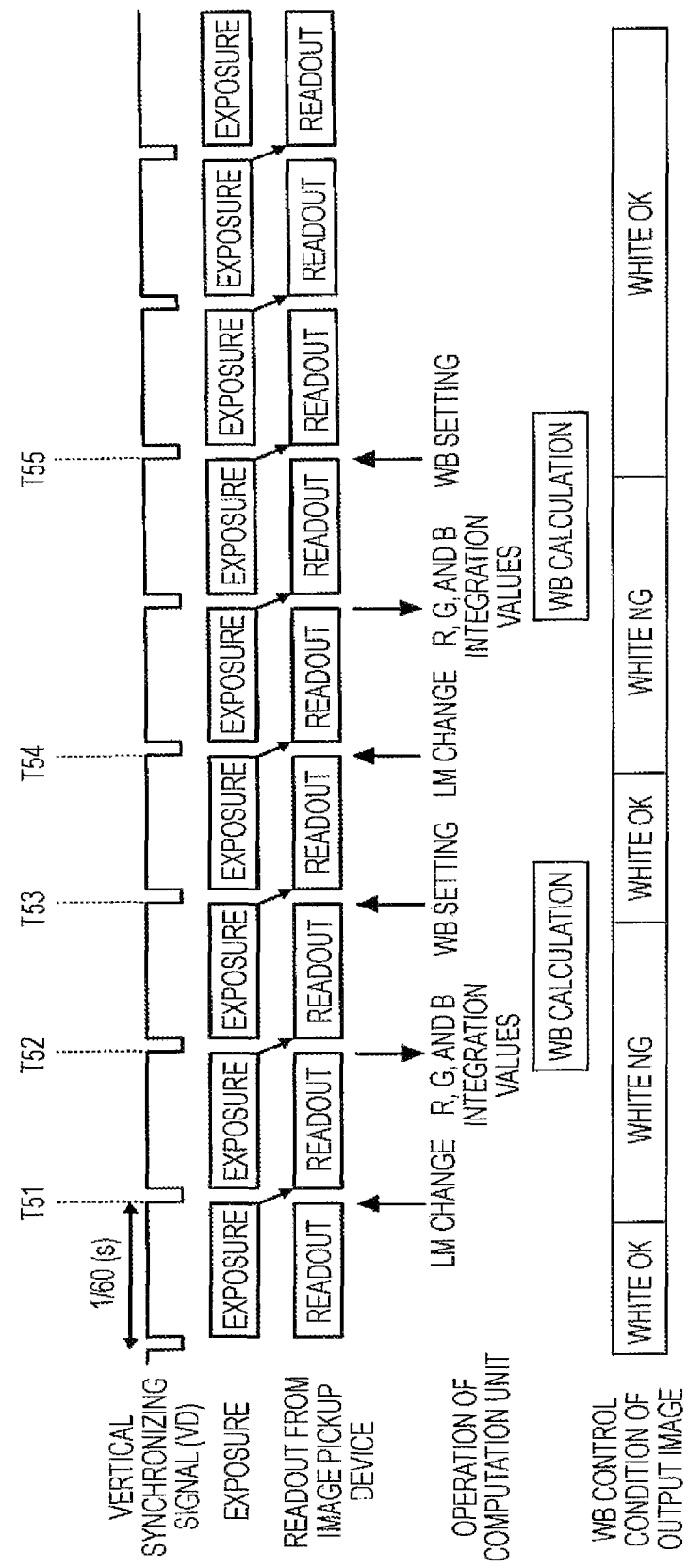
FIG. 10 is a timing chart showing the operation of each unit included in the known imaging apparatus when matrix coefficients are changed.
Figure 11:
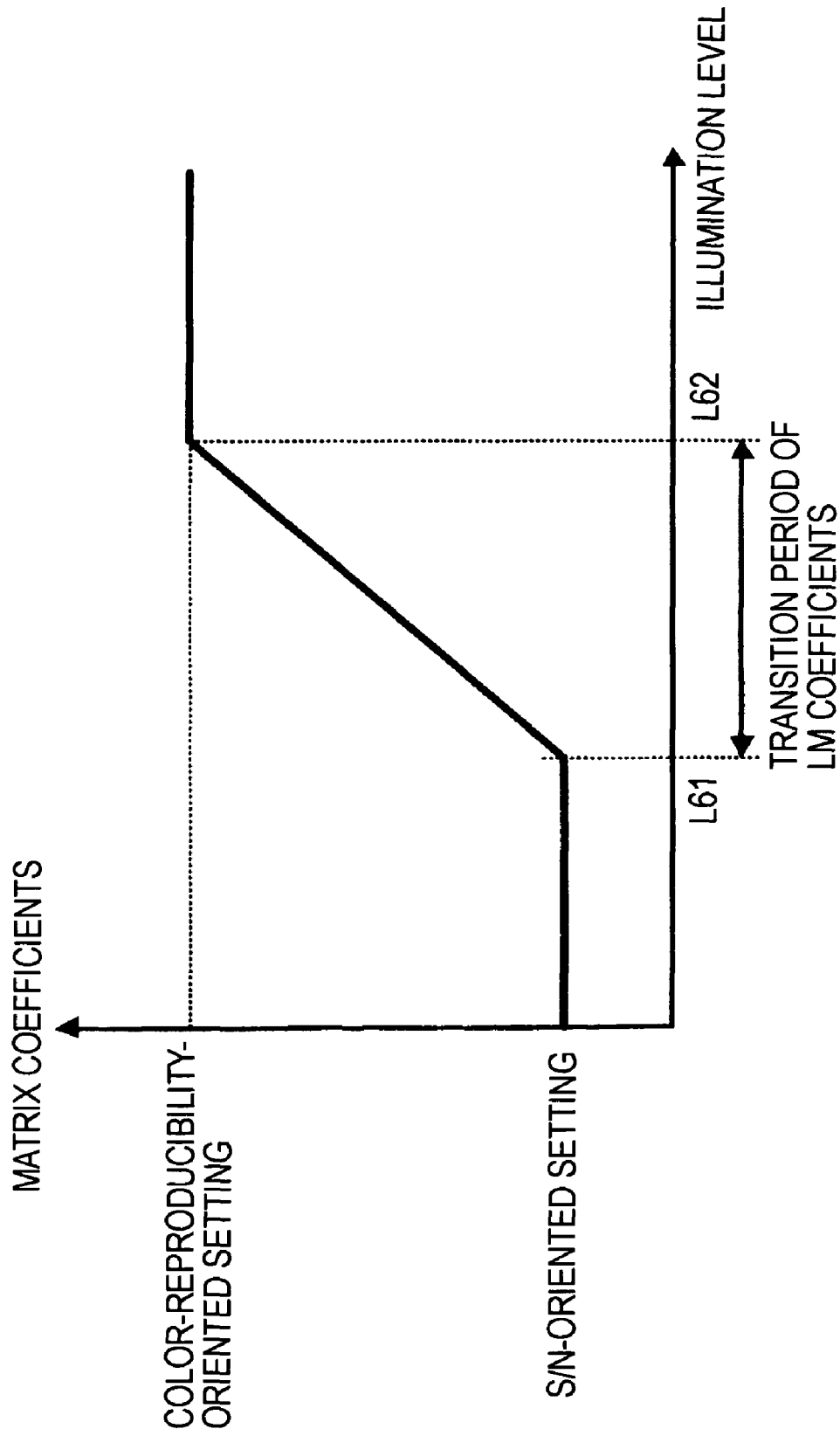
FIG. 11 is a diagram showing exemplary set values of matrix coefficients corresponding to illumination levels.

FIG. 8 is a block diagram showing the internal configuration of a camera signal processing circuit according to the third embodiment of the present invention. In FIG. 8, the same reference numerals are used for functions similar to those shown in FIG. 2 to avoid repeated description.

The feature of a camera signal processing circuit 4b according to the third embodiment is that it has both a calculation function based on an illumination level which has been described in the first embodiment and a calculation function based on a brightness level on a pixel-by-pixel basis which has been described in the second embodiment as a function of calculating the combination ratio α for the MIX circuit 46, and selectively sets one of the calculated values for the MIX circuit 46.

Referring to FIG. 8, the microcontroller 5 obtains an illumination level on the basis of the limited amount of exposure set for an exposure control mechanism and a brightness level based on a value that is acquired by causing an image signal corresponding to one frame (or one field) which has been output from the linear matrix operation circuit 41b to be detected by the integration circuit 45, and calculates a combination ratio α1 on the basis of the obtained illumination level. The camera signal processing circuit 4b is provided with the Y signal generation circuit 49 and the a calculation circuit 50. The Y signal generation circuit 49 generates a brightness level on a pixel-by-pixel basis on the basis of an image signal output from the demosaic processing circuit 44, and the a calculation circuit 50 generates a combination ratio α2 on the basis of the generated brightness level. Furthermore, the camera signal processing circuit 4b is provided with an α selection circuit 51 for selectively outputting one of the combination ratios α1 and α2. A combination ratio α output from the α selection circuit 51 is set for the MIX circuit 46.

The α selection circuit 51 selects either the combination ratio α1 or α2, whichever value is lower, and outputs the selected one to the MIX circuit 46. According to such control processing, for example, if a brightness level detected from an entire screen is relatively low, the value of the combination ratio α1 becomes low, whereby the combination ratio α having a low value is set for the entire screen. At that time, signal combination is performed upon a relatively bright area on the screen using the combination ratio α1 that has a constant value, and upon a relatively dark area that occupies a large portion of the screen using the combination ratio α2 whose value has corresponded to a brightness level on a pixel-by-pixel basis.

Here, gains are set for the white balance control circuits 42a and 42b as standards of reference used for controlling different white areas, and therefore, there may occur a difference in color tone in the area of the screen where different combination ratios α are set. This results in an image that is discomforting to view. For example, if almost all of the screen is a dark area and a bright subject is present in a very small area, the color tone difference between areas becomes conspicuous. When such an image is shot, by performing the above-described selection control of a combination ratio α, a combination ratio α having a low value is set for a single screen. Consequently, color tone difference becomes smaller, and an image more pleasing to the eye can be obtained.

In contrast, if the brightness level detected from the entire screen is relatively high, the combination ratio α1 becomes high. From this, it can be determined that a bright area is larger than a dark area in an image. In this case, as the dark area is very small and the color component level in the dark area is low, the color tone difference between the dark and bright areas is inconspicuous. Accordingly, by performing the above-described selection control of a combination ratio α, color reproducibility becomes higher in the bright area, whereas, a decrease in the S/N ratio can be prevented with certainty in the dark area, without making the color tone difference recognizable. If the value of the combination ratio α1 or a brightness level detected by the microcontroller 5 becomes larger than a constant value, the combination ratio α2 may be continuously selected by the α selection circuit 51.

In the above-described embodiments, one color-reproducibility-oriented signal processing system and one noise-reduction-oriented signal processing system are disposed, but two or more color-reproducibility-oriented and/or noise-reduction-oriented signal processing systems may be disposed. In this case, the MIX circuit 46 may flexibly combine signals output from these signal processing systems in accordance with the illumination level or the brightness level.

In addition, in the above-described embodiments, a linear matrix operation is applied for improving the color reproducibility and S/N ratio. Instead of the linear matrix operation, for example, the present invention may be applied to a nonlinear operation used for converting color space and correcting image quality.

The present invention may also be applied to various imaging apparatuses using solid-state image pickup devices, such as a digital video camera and a digital still camera, a mobile telephone or a PDA (Personal Digital Assistant) which has an imaging function, and a processor and a recorder for processing and recording an imaging signal obtained by a miniature camera for a videophone connected to a PC (Personal Computer) or for game software.

Furthermore, the present invention may be applied to an image processor for correcting image quality after receiving an image signal. In this case, the image processor detects the brightness of a subject on the basis of the input image signal, and controls a combination ratio used for combining signals output from signal processing systems.

The above-described processing functions can be achieved by a computer. In this case, a program in which the processing details of functions (the image quality correction function performed by the camera signal processing circuit, the combination ratio setting function performed by the microcontroller, etc.) required for the imaging apparatus are written is provided for the computer. The computer executes the provided program, whereby the above-described processing functions can be achieved on the computer. The program in which the processing details are written can be stored in a computer readable storage medium. The computer readable storage medium may be a magnetic recorder, an optical disc, a magneto-optical disk, or a semiconductor memory.

If the program is distributed, for example, portable recording media with the program recorded thereon, such as an optical disc or a semiconductor memory, are sold. Also, the program may be stored in the storage unit of a server computer, and may be transmitted via a network from the server computer to other computers.

A computer executing the program, for example, stores the program stored in the portable recording medium or transmitted from the server computer in its own storage unit. The computer reads out the program from its own storage unit and performs processing in accordance with the program. The computer may read out the program directly from the portable recording medium to perform processing in accordance with the program. The computer may perform processing in accordance with the received program every time the program is transmitted from the server computer.

It should be understood by those skilled in the art that various modifications, combinations, sub-combinations and alterations may occur depending on design requirements and other factors insofar as they are within the scope of the appended claims or the equivalents thereof.

The invention claimed is:

1. An imaging apparatus for imaging an image using a solid-state image pickup device, comprising:
    first linear matrix operation means for performing matrix conversion upon a color component of an image signal obtained by imaging using coefficients capable of improving color reproducibility;
    second linear matrix operation means for performing matrix conversion upon the color component using coefficients capable of achieving noise component reduction;
    signal combining means for combining image signals output from a plurality of signal processing systems each of which includes one of the first linear matrix operation means or the second linear matrix operation means; and
    combination ratio setting means for setting a combination ratio to be used by the signal combining means so that, when a subject is bright, the image signals output from the signal processing system that includes the first linear matrix operation means can be combined in an amount larger than the image signals output from the other signal processing systems.

2. The imaging apparatus according to claim 1, further comprising:
a plurality of white balance adjusting means, each of the plurality of signal processing systems including one of the white balance adjusting means for adjusting, on a color component-by-color component basis, a gain of the image signal output from the one of the first or second linear matrix operation means in that signal processing system; and
white balance control means for individually controlling gains of the plurality of white balance adjusting means in accordance with image signals to be input into the plurality of white balance adjusting means so that a white balance can be adjusted in the plurality of white balance adjusting means.

3. The imaging apparatus according to claim 1, wherein the combination ratio setting means sets the combination ratio so that, when an illumination level is high at the time of imaging, the image signals output from the signal processing system that includes the first linear matrix operation means can be combined in an amount larger than the image signals output from the other signal processing systems.

4. The imaging apparatus according to claim 3, wherein the combination ratio setting means calculates the illumination level based on a brightness level detected from the image signal obtained by imaging, and a current limited amount of exposure set for an exposure controlling mechanism.

5. The imaging apparatus according to claim 4, further comprising:
a plurality of white balance adjusting means, each of the plurality of signal processing systems including one of the white balance adjusting means for adjusting, on a color component-by-color component basis, a gain of the image signal output from the one of the first or second linear matrix operation means in that signal processing system; and
white balance control means for individually controlling gains of the plurality of white balance adjusting means in accordance with integration values of image signals to be input into the plurality of white balance adjusting means so that a white balance can be adjusted in the plurality of white balance adjusting means,
wherein the combination ratio setting means detects the brightness level based on one of the integration values of the image signals to be input into the plurality of white balance adjusting means.

6. The imaging apparatus according to claim 1, wherein the combination ratio setting means sets the combination ratio on a pixel-by-pixel basis so that, when a brightness level detected on a pixel-by-pixel basis from the image signal obtained by imaging is high, the image signals output from the signal processing system that includes the first linear matrix operation means can be combined in an amount larger than the image signals output from the other signal processing systems.

7. The imaging apparatus according to claim 1, wherein the combination ratio setting means includes,
first combination ratio calculation means for calculating a first combination ratio that enables the image signals output from the signal processing system that includes the first linear matrix operation means to be combined in an amount larger than the image signals output from the other signal processing systems when an illumination level is high at the time of imaging,
second combination ratio calculation means for calculating a second combination ratio, on a pixel-by-pixel basis, that enables an image signal output from the signal processing system that includes the first linear matrix operation means to be combined in an amount larger than the image signals output from the other signal processing systems when a brightness level detected, on a pixel-by-pixel basis, from the image signal obtained by imaging is high, and
combination ratio selection means for selecting the lower of the first and the second combination ratio to be used by the signal combining means.

8. The imaging apparatus according to claim 1, wherein the coefficients used by the first linear matrix operation means enable an input image signal to be corrected so that the spectral characteristic of a color component of the solid-state image pickup device can be brought closer to a color matching function approximately equal to human vision characteristics.

9. The imaging apparatus according to claim 1, wherein at least one of a plurality of off-diagonal components among the coefficients used by the first linear matrix operation means has a negative value.

10. The imaging apparatus according to claim 1, wherein the coefficients used by the second linear matrix operation means are capable of being set as a unit matrix.

11. The imaging apparatus according to claim 1, wherein the combination ratio setting means sets the combination ratio so that, when the image signals output from the plurality of individual signal processing systems are combined, the proportions of the image signals add up to unity.

12. An image processor for performing color correction processing upon an input image signal, comprising:
first linear matrix operation means for performing matrix conversion upon a color component of the input image signal using coefficients capable of improving color reproducibility;
second linear matrix operation means for performing matrix conversion upon a color component of the input image signal using coefficients capable of achieving noise component reduction;
signal combining means for combining image signals output from a plurality of signal processing systems each of which includes one of the first linear matrix operation means or the second linear matrix operation means; and
combination ratio setting means for setting a combination ratio to be used by the signal combining means so that, when an image based on the input image signal is bright, the image signals output from the signal processing system that includes the first linear matrix operation means can be combined in an amount larger than the image signals output from the other signal processing systems.

13. A method of performing color correction processing upon an input image signal, the method comprising:
performing a first matrix conversion upon a color component of the input image signal using coefficients capable of improving color reproducibility;
performing a second matrix conversion upon a color component of the input image signal using coefficients capable of achieving noise component reduction;
combining image signals output from the first matrix conversion and from the second matrix conversion; and
setting a combination ratio to be used in the combining step so that, when an image based on the input image signal is bright, the image signal output from the first matrix conversion can be combined in an amount larger than the image signals output from the second matrix conversion.

14. A computer-readable medium encoded with an image processing program for causing a computer to perform a process of color correction upon an input image signal, the process comprising:
- performing a first matrix conversion upon a color component of the input image signal using coefficients capable of improving color reproducibility;
- performing a second matrix conversion upon a color component of the input image signal using coefficients capable of achieving noise component reduction;
- combining image signals output from the first matrix conversion and from the second matrix conversion; and
- setting a combination ratio to be used in the combining step so that, when an image based on the input image signal is bright, the image signal output from the first matrix conversion can be combined in an amount larger than the image signals output from the second matrix conversion.

15. An imaging apparatus for imaging an image using a solid-state image pickup device, comprising:
- a first linear matrix operation unit configured to perform matrix conversion upon a color component of an image signal obtained by imaging using coefficients capable of improving color reproducibility;
- a second linear matrix operation unit configured to perform matrix conversion upon the color component of the image signal using coefficients capable of achieving noise component reduction;
- a signal combining unit configured to combine image signals output from a plurality of signal processing systems each of which includes one of the first linear matrix operation unit or the second linear matrix operation unit; and
- a combination ratio setting unit configured to set a combination ratio to be used by the signal combining unit so that, when a subject is bright, the image signals output from the signal processing system that includes the first linear matrix operation unit can be combined in an amount larger than the image signals output from the other signal processing systems.

16. An image processor for performing color correction processing upon an input image signal, comprising:
- a first linear matrix operation circuit to perform matrix conversion upon a color component of the input image signal using coefficients capable of improving color reproducibility;
- a second linear matrix operation circuit to perform matrix conversion upon a color component of the input image signal using coefficients capable of achieving noise component reduction;
- a signal combining circuit to combine image signals output from a plurality of signal processing systems each of which includes one of the first linear matrix operation circuit or the second linear matrix operation circuit; and
- a combination ratio setting circuit to set a combination ratio to be used by the signal combining circuit so that, when an image based on the input image signal is bright, the image signals output from the signal processing system that includes the first linear matrix operation circuit can be combined in an amount larger than the image signals output from the other signal processing systems.

* * * * *